(12) United States Patent
Milo

(10) Patent No.: US 9,896,116 B2
(45) Date of Patent: Feb. 20, 2018

(54) WHEELBARROW WITH AUXILIARY STORAGE

(71) Applicant: Milo Medical IP, LLC, Akron, OH (US)

(72) Inventor: Anton G. C. Milo, Akron, OH (US)

(73) Assignee: Milo Medical IP, LLC, Akron, OH (US)

( * ) Notice: Subject to any disclaimer, the term of this patent is extended or adjusted under 35 U.S.C. 154(b) by 0 days.

(21) Appl. No.: 14/798,728

(22) Filed: Jul. 14, 2015

(65) Prior Publication Data

US 2016/0009305 A1    Jan. 14, 2016

Related U.S. Application Data

(60) Provisional application No. 62/090,168, filed on Dec. 10, 2014, provisional application No. 62/024,166, filed on Jul. 14, 2014.

(51) Int. Cl.
*B62B 1/20*    (2006.01)
*B62B 1/22*    (2006.01)
*B62B 1/26*    (2006.01)

(52) U.S. Cl.
CPC .............. *B62B 1/20* (2013.01); *B62B 1/22* (2013.01); *B62B 1/262* (2013.01)

(58) Field of Classification Search
CPC .. B62B 1/18; B62B 1/20; B62B 1/202; B62B 1/204; B62B 1/22; B62B 2202/48; B62B 2202/50
See application file for complete search history.

(56) References Cited

U.S. PATENT DOCUMENTS

| 2,485,051 | A |   | 10/1949 | Joslin |             |
|-----------|---|---|---------|--------|-------------|
| 2,805,885 | A |   | 9/1957  | Elzea  |             |
| 2,926,021 | A | * | 2/1960  | Altadonna | B62B 1/20 |
|           |   |   |         |        | 280/11      |
| 3,161,434 | A | * | 12/1964 | Jerpbak | B62B 1/20  |
|           |   |   |         |        | 280/47.31   |
| 3,870,367 | A | * | 3/1975  | O'Brien | B62B 1/20  |
|           |   |   |         |        | 280/47.31   |
| 4,361,340 | A | * | 11/1982 | Soriano | B62B 3/146 |
|           |   |   |         |        | 280/33.992  |
| 4,643,280 | A | * | 2/1987  | Hensley | A45C 3/02  |
|           |   |   |         |        | 108/44      |

(Continued)

OTHER PUBLICATIONS

International Search Report and Written Opinion from International Application No. PCT/US2015/040280 dated Oct. 5, 2015.

*Primary Examiner* — Frank B Vanaman
(74) *Attorney, Agent, or Firm* — Calfee, Halter & Griswold LLP

(57) ABSTRACT

A wheelbarrow apparatus that includes a frame assembly, a tub, a wheel assembly, and at least one auxiliary storage device and/or transport pin. In one embodiment, an auxiliary storage devices is a tube for storing elongated items, such as tools with elongated handles (e.g., rakes and shovels), and thin pieces of wood, metal, etc. In another embodiment, an auxiliary storage devices is a storage bin for storing smaller items, such as small hand tools, hardware, adhesive, rope, tool belt, papers, etc. In another embodiment, a transport pin is used to stabilize items during transport.

25 Claims, 9 Drawing Sheets

(56) References Cited

U.S. PATENT DOCUMENTS

| | | | | |
|---|---|---|---|---|
| 5,002,215 A * | 3/1991 | Gregoire | B62B 3/1428 | 206/425 |
| 5,002,292 A * | 3/1991 | Myers | B62B 3/146 | 280/33.992 |
| 5,159,777 A * | 11/1992 | Gonzalez | A01K 97/08 | 280/47.19 |
| 5,318,315 A * | 6/1994 | White | B62B 1/10 | 280/47.18 |
| 5,374,095 A * | 12/1994 | Ramseth | B62B 1/20 | 280/47.18 |
| 5,380,022 A * | 1/1995 | Dennis | A47B 5/02 | 280/47.35 |
| 5,415,421 A * | 5/1995 | Godwin | B62B 1/18 | 224/401 |
| 5,927,107 A * | 7/1999 | Mitchell | E05C 19/003 | 292/259 R |
| 6,079,719 A * | 6/2000 | Tisbo | A47B 88/044 | 280/47.19 |
| 6,139,029 A * | 10/2000 | Shaw | B62B 13/18 | 280/47.371 |
| 6,398,235 B1 * | 6/2002 | Cary | B25H 3/00 | 280/47.18 |
| 6,685,132 B1 * | 2/2004 | Allen | B65H 49/32 | 242/557 |
| 6,857,298 B2 * | 2/2005 | Linares | E05B 63/143 | 292/DIG. 37 |
| 6,883,268 B2 * | 4/2005 | Fraser | A01K 97/22 | 206/315.11 |
| 7,100,402 B2 * | 9/2006 | Holmgren | E05B 73/0023 | 206/1.5 |
| 7,594,353 B2 * | 9/2009 | Lucky | A01K 97/10 | 211/70.8 |
| 2004/0035732 A1 | 2/2004 | Udy | | |
| 2005/0280227 A1 | 12/2005 | Murphy et al. | | |
| 2006/0232033 A1 * | 10/2006 | Pint | B62B 3/02 | 280/79.2 |
| 2007/0039986 A1 * | 2/2007 | Tomasi | B25H 3/04 | 224/401 |
| 2010/0127028 A1 | 5/2010 | Lusk | | |
| 2012/0292213 A1 * | 11/2012 | Brunner | B25H 3/028 | 206/349 |

* cited by examiner

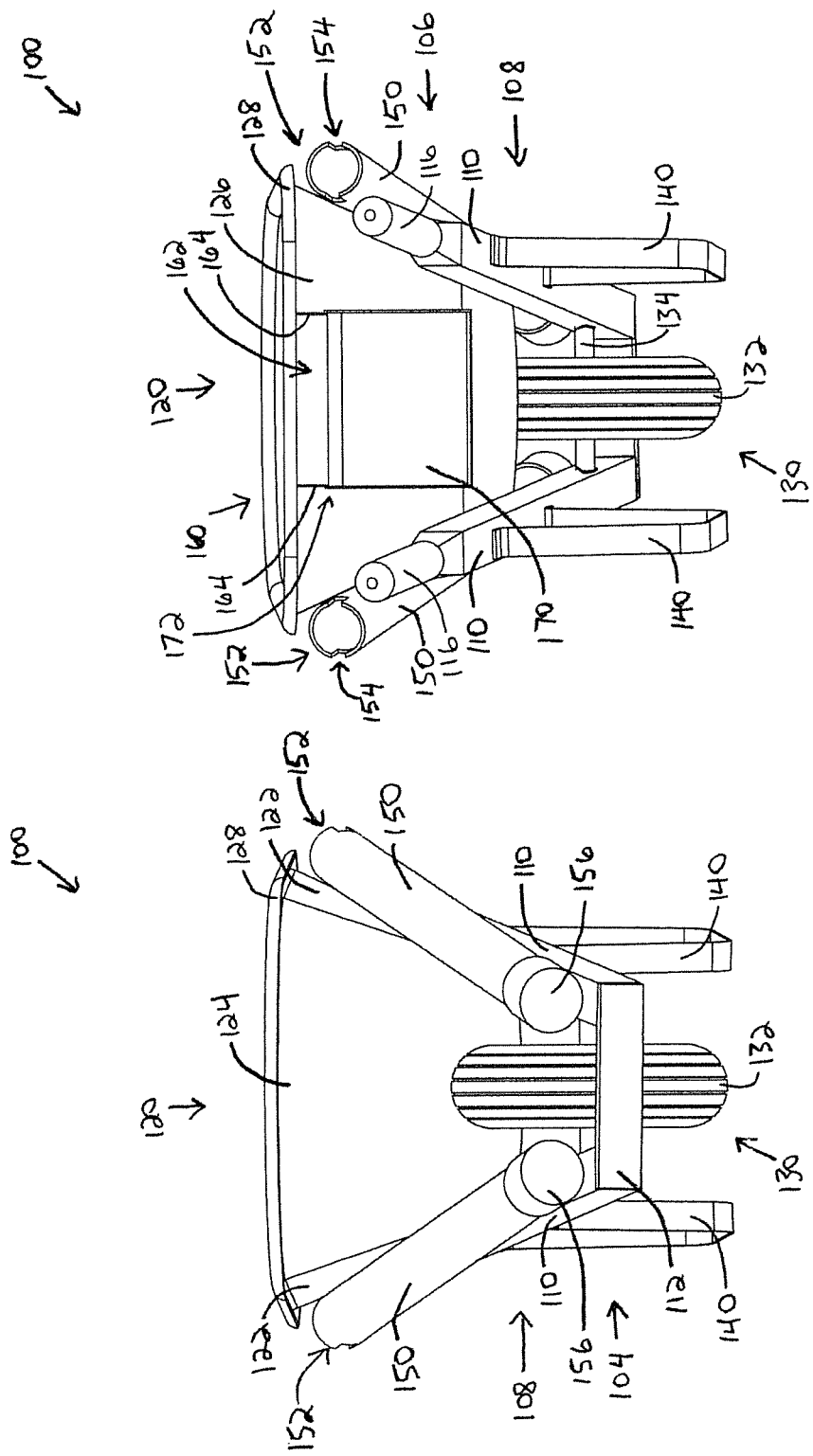

WHEELBARROW WITH AUXILIARY STORAGE

CROSS REFERENCE TO RELATED APPLICATIONS

This application claims priority to, and any other benefit of, U.S. Provisional Patent Application Ser. No. 62/024,166, filed on Jul. 14, 2014 and entitled WHEELBARROW WITH AUXILIARY STORAGE and U.S. Provisional Patent Application Ser. No. 62/090,168, filed on Dec. 10, 2014 and entitled WHEELBARROW WITH AUXILIARY STORAGE.

BACKGROUND

Wheelbarrows are designed to haul various materials in a tub of the wheelbarrow. The materials are typically associated with a particular project that also requires various other materials, including, for example, tools, gloves, hardware, etc.

SUMMARY

According to one embodiment, a wheelbarrow includes a frame assembly including a front extension, a rear extension, and a base extension, a tub mounted to the frame assembly, a wheel assembly including at least one wheel mounted to the front extension such that the tub is supported by the wheel assembly and the base extension when the wheelbarrow is at rest and the tub is supported by the wheel assembly and a user when the user lifts the rear extension to allow the wheel to rotate to move the wheelbarrow, and at least one auxiliary storage device.

The descriptions of the invention do not limit the words used in the claims in any way or the scope of the claims or invention. The words used in the claims have all of their full ordinary meanings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention and highlight the functional modality of the invention, including any methods.

FIG. 4 is a front view of one embodiment of a wheelbarrow having multiple auxiliary storage devices;

FIG. 5 is a rear view of one embodiment of a wheelbarrow having multiple auxiliary storage devices;

DESCRIPTION OF EMBODIMENTS

Figure 1:
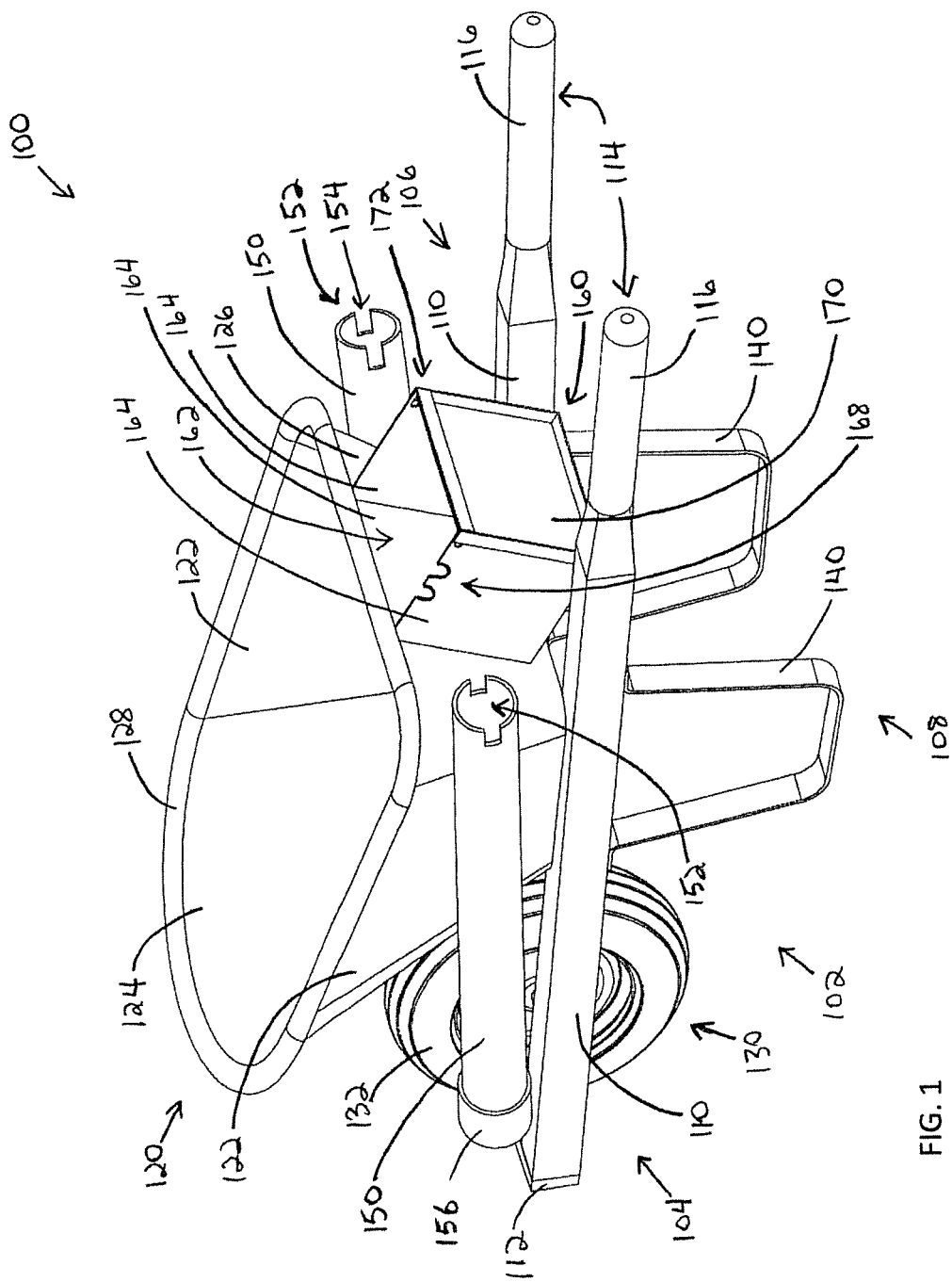
FIG. 1 is a rear-side perspective view of one embodiment of a wheelbarrow having multiple auxiliary storage devices.

FIG. 1 illustrates a rear-side perspective view of one embodiment of a wheelbarrow 100 having multiple auxiliary storage devices. Exemplary wheelbarrow 100 includes a frame assembly 102 including a front extension 104, a rear extension 106, and a base extension 108. The frame assembly 102 may be constructed from various materials, including, for example, plastic, wood, metal, and combinations thereof.

In this embodiment, the frame assembly 102 includes two side members 110. The side members 110 may form portions of the front extension 104, the rear extension 106, and the base extension 108. As shown in this embodiment, the side members 110 form a portion of the front extension 104, which also includes a front cross member 112. Also shown in this embodiment, the side members 110 form a portion of the rear extension 106 with handles 114. The handles 114 may include grips 116 to increase friction and/or improve comfort when the handles 114 are grasped by a user. The grips 116 may be constructed from various materials, including, for example, rubber, foam, tape, etc.

FIGS. 2-5 show various other views of the wheelbarrow 100, including a top view (FIG. 2), a side view (FIG. 3), a front view (FIG. 4), and a rear view (FIG. 5).

Figure 2:
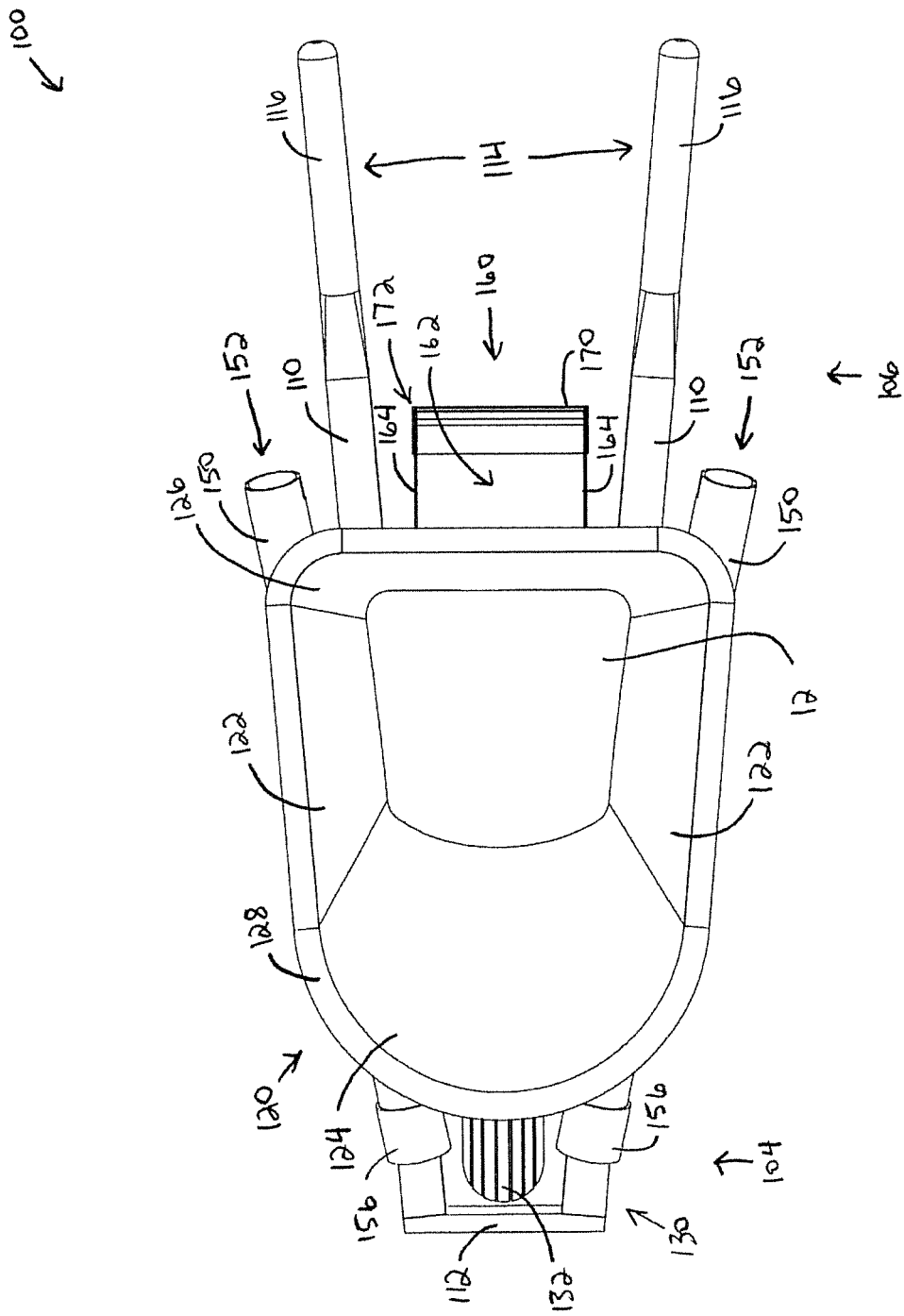
FIG. 2 is a top view of one embodiment of a wheelbarrow having multiple auxiliary storage devices.
Figure 3:
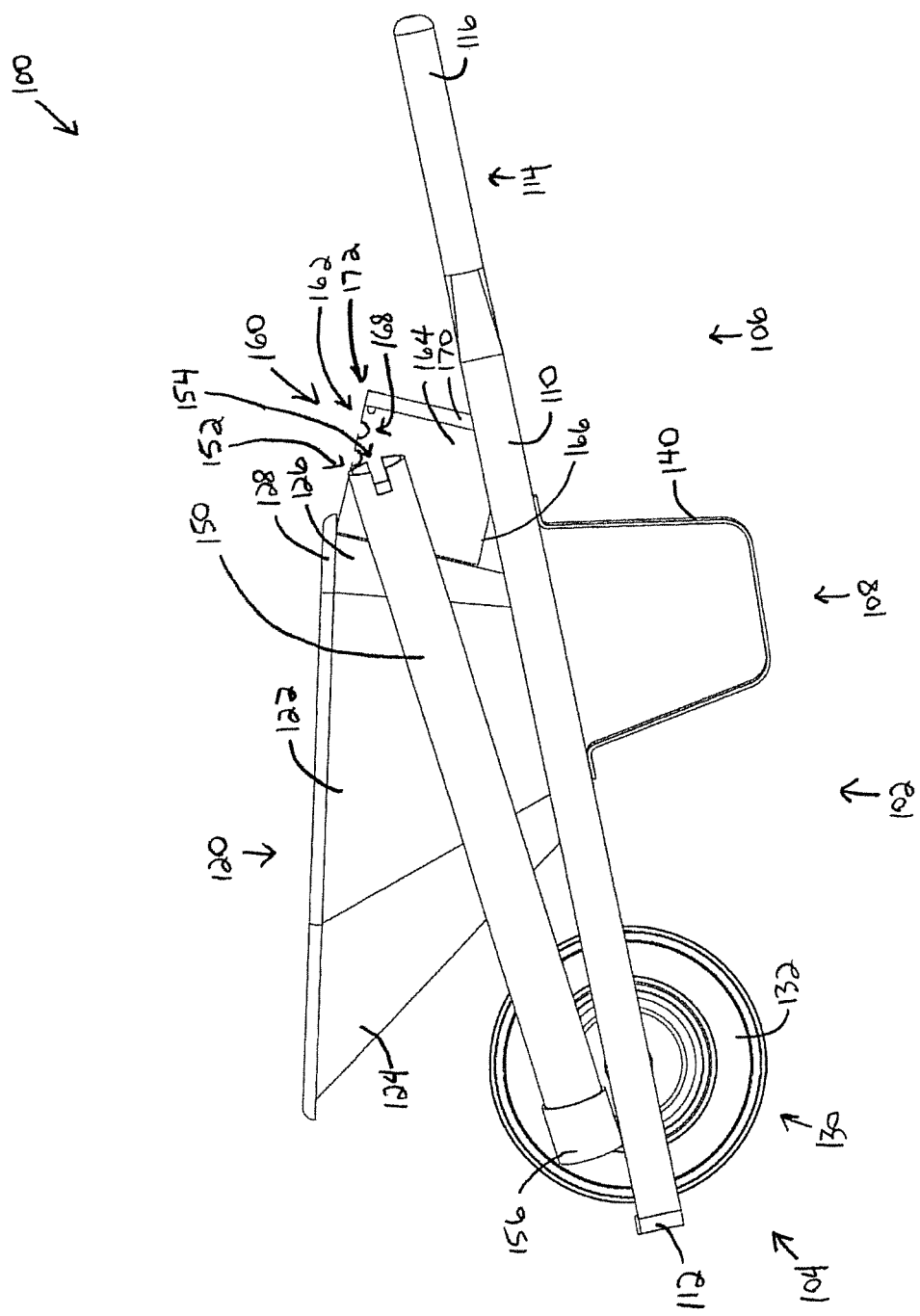
FIG. 3 is a side view of one embodiment of a wheelbarrow having multiple auxiliary storage devices.

With continued reference to FIG. 1 and further reference to FIG. 2, the wheelbarrow 100 also includes a tub 120 mounted to the frame assembly 102. In one embodiment, the tub 120 may be mounted to the side members 110 of the frame assembly 102. In another embodiment, the tub 102 may be mounted to cross members (not shown) mounted between the side members 110 of the frame assembly 102. In this embodiment, the tub 120 includes two side walls 122, a front wall 124, a rear wall 126, and a bottom wall 127. The tub 120 also includes a rim 128 around a top perimeter of the tub 120. In one embodiment, the rim 128 is a molded or rolled edge. As shown in this embodiment, the rim 128 may be curved and form an arc along a tight radius extending outward approximately 180 degrees from the top perimeter of the tub 120 walls. The tub 120 may be constructed from various materials, including, for example, plastic, metal, etc. The tub 120 may be formed as one piece or may be assembled from multiple pieces to create the side walls 122, front wall 124, rear wall 126, bottom wall 127, and rim 128. The tub 120 may also include various coatings.

The wheelbarrow 100 also includes a wheel assembly 130 mounted to the front extension 104 of the frame assembly 102. In one embodiment, the wheel assembly 130 includes one wheel 132. In other embodiments, the wheel assembly 130 may include more than one wheel. With additional reference to FIG. 5, the wheel assembly 130 includes a wheel axle 134 for mounting the wheel 132 to the front extension 104 of the frame assembly 102, such that the wheel 132 rotates about the wheel axle 134. The wheel 132 may include a separate tire and rim or may be one piece. The wheel 132 may be constructed from various materials, including, for example, rubber, plastic, etc. The wheel assembly 130 may also include other components, such as, for example, a wheel hub, a wheel bearing, etc., suitable for allowing the wheelbarrow 100 to roll in a preferably stable and smooth manner With additional reference to FIG. 3, the base extension 108 of the frame assembly 102 includes leg supports 140 mounted to the side members 110 of the frame assembly 102. In this embodiment, the leg supports 140 are "U" shaped such that the bottom of the "U" can support the wheelbarrow 100 on the ground. In other embodiments, the leg supports may be any shape and configuration suitable for supporting the wheelbarrow 100, including, for example, straight supports. The leg supports 140 may be constructed from various materials, including, for example, plastic, wood, metal, and combinations thereof.

In one embodiment, the side members 110 have a square or rectangular cross section where the tub 120, the wheel assembly 130, and the leg supports 140 are mounted to the side members 110 and a round or elliptical cross section where the side members 110 are formed into the handles 114.

The wheelbarrow 100 is configured such that the tub 120 is supported by the wheel assembly 130 and the leg supports 140 of the base extension 108 when the wheelbarrow 100 is at rest. When the wheelbarrow 100 is in motion, the tub 120 is supported by the wheel assembly 130, as the wheel 132 rolls along the ground, and a user as the user lifts the handles 114 of the rear extension 106, which lifts the leg supports 140 off of the ground and allows the wheel 132 to rotate to move the wheelbarrow 100 at the direction of the user.

Other embodiments of the wheelbarrow 100 may include various other components, configurations of components, shapes of components, and component materials for the wheelbarrow 100. The wheelbarrow 100 also includes various mounting members, which may include, for example, brackets, hardware (e.g., nuts, bolts, screws, washers, etc.), spacers, adhesives, etc., necessary to assemble the various components mentioned above.

The wheelbarrow 100 also includes one or more auxiliary storage devices. As shown, the wheelbarrow 100 includes two exemplary tubes 150 and an exemplary storage bin 160 for storing various items and materials associated with the wheelbarrow 100 or a project, as described in more detail below.

One or more tubes 150 may be affixed to the frame assembly 102, the tub 120, and/or another portion of the wheelbarrow 100. In one embodiment, as shown, two tubes 150 are each affixed to the side members 110 of the frame assembly 102 and the side walls 122 of the tub 120. In particular, with further reference to FIGS. 3-4, each of the tubes 150 is affixed to a top side of one of the side members 110 near a front end of the tube 150 and is affixed to the outer surface of one of the side walls 122 near a rear end of the tube 150. The tubes 150 may be affixed to the frame assembly 102, the tub 120, and/or another portion of the wheelbarrow 100 using one or more mounting members, which may include, for example, various brackets, hardware (e.g., nuts, bolts, screws, washers, etc.), spacers, adhesives, etc., necessary to affix or mount the tubes 150.

The tubes 150 each have at least one open end 152 at the rear end of the tube 150. As described in more detail below, the open end 152 of the tube 150 can accept various elongated items, such as, for example, tools with elongated handles (e.g., rakes and shovels), and thin pieces of wood, metal, etc. to allow for storage of the item on the wheelbarrow 100. The open end 152 of the tube 150 may also include one or notches 154 around the perimeter of the open end 152. These notches 154 may be used to engage a feature on the end of the stowed item, such as, for example, the tine of a rake or the spade of a shovel, to prevent the item from moving or rotating within the tube 150. The notches 154 may be oriented in various configurations, including, for example, an opposing pair of notches 154 (e.g., approximately 180 degrees around the perimeter of the open end 152 of the tube 150) in a horizontal orientation, an opposing pair of notches 154 in a vertical orientation, combinations thereof, etc. Different embodiments can include a tube 150 with various combinations of notch 154 sizes and configurations, including, for example, multiple pairs of same and/or different sized notches 154 distributed around the perimeter of the open end 152 of the tube 150 using a variety of spacing patterns.

The other end of the tubes 150 at the front end may also include an open end or may be closed. As shown, the tubes 150 each have a closed end at the front end of the tube 150. The closed end may be formed with the tube 150 or may be closed with a cap 156. In some embodiments, the cap 156 may be perforated or otherwise vented.

In some situations, it may be advantageous to have the tube 150 open or capped but perforated/vented to allow for cleaning, drainage, airflow, etc. In other situations, it may advantageous to have the tube 150 closed or capped to prevent items from sliding out of the tube 150. For example, materials without features that would prevent them from passing through the open end 152 of the tube 150, such as pipes, lengths of wood, pieces of rebar, etc., can be stored in the tube 150 without falling out if the front end of the tube 150 is closed. In some embodiments, the cap 156 may be removable so that the tube 150 can selectively function as a closed tube and an open tube. In other embodiments, the cap 156 may also be used to close the rear open end 152 of the tube 150.

The tubes 150 may be cylindrically shaped as shown. However, in other embodiments, the tubes 150 may have elliptical, square, rectangular, or any other shaped cross-section. In other embodiments, the cross-section shape may vary from one end of the tube 150 to the other end. For example, the tube 150 may narrow, taper, and/or step at some point over the length of the tube 150. This may be advantageous, for example, in situations where items with different lengths and/or other features are stored in the same tube 150 and changes in the tube 150 geometry prevent and/or allow different items to slide into the tube 150 more or less. In other embodiments, the tubes 150 may include various dividers (not shown) to compartmentalize the tubes 150 into different areas. For example, in various embodiments, these dividers may be along the length of the tube 150 or may be only at the open end 152.

The tubes 150 and caps 156 may be constructed from various materials, including, for example, plastic, metal, etc. In other embodiments, the tubes 150 and/or caps 156 may be constructed from different materials. In yet other embodiments, one or more tubes 150 may be integrated or formed with the tub 120 as a one-piece assembly. For example, the tub 120 and one or more tubes 150 may be molded as one plastic part.

As shown in this embodiment, the tubes 150, notches 152, and caps 156 have the same size, configuration, mounted location (opposite side), etc. In other embodiments, any combination of tubes 150, notches 152, and caps 156 with various sizes (e.g., diameters, lengths, tapers, etc.), configurations (e.g., open, closed, capped, etc.), locations (affixing points, pitch angles, etc.), materials, can be utilized in one or more wheelbarrows 100. Utilization of different tubes 150 on the same wheelbarrow 100 may be advantageous to accommodate storing a variety of items on one wheelbarrow 100.

One or more storage bins 160 may also or alternatively be affixed to the frame assembly 102, the tub 120, and/or another portion of the wheelbarrow 100. In one embodiment, as shown, a storage bin 160 is affixed to the rear wall 126 of the tub 120. In particular, with further reference to FIG. 3 and FIG. 6, the storage bin 160 is affixed to the outer surface of the rear wall 126 towards the rear of the wheelbarrow 100 between the side members 110. In other embodiments, the storage bin 160 may be affixed to the frame assembly 102, including, for example, the side members 110 in addition to or without affixing to the tub 120. In yet other embodiments, the storage bin 160 may be affixed to a cross member of the frame assembly 102 mounted between the side members 110 in addition to or without affixing to the tub 120. The storage bin 160 may be affixed to the frame assembly 102, the tub 120, and/or another portion of the wheelbarrow 100 using one or more mounting members, which may include, for example, various brackets, hardware (e.g., nuts, bolts, screws, washers, etc.), spacers, adhesives, etc., necessary to affix or mount the storage bin 160.

The storage bin 160 has an open area (e.g., top or side) and various surfaces to form a storage volume capable of storing various items. As shown in this embodiment, the storage bin 160 includes an open top 162, side surfaces 164, and a bottom surface 166. In one embodiment, the outer surface of the rear wall 126 of the tub 120 acts as a side surface 164 of the storage bin 160. In other embodiments, where the storage bin 160 is affixed to the tub 120 in other locations, other walls of the tub 120 may act as surfaces of the storage bin 160. As described in more detail below, the open top 162 of the storage bin 160 can accept a variety of items to allow for storage of the items on the wheelbarrow 100. The open top 162 of the storage bin 160 may also include one or notches 168 around the perimeter of the open top 162 (i.e., along the top of the side surfaces 164). These notches 168 may be used to engage a feature of a stored item to hang or attach the item to the side surface 164 of the storage bin 160, including inside or outside of the storage bin 160. The notches 168 may be oriented in various configurations and be of various shapes and sizes.

The bottom surface 166 of the storage bin 160 may have holes (not shown). In some situations, it may be advantageous to have holes for engaging features of stored items and/or to allow for cleaning, drainage, airflow, etc. In some embodiments, the holes may be selectively plugged or capped.

The storage bin 160 may be box shaped (with a rectangular cross section) as shown. However, in other embodiments, the storage bin 160 may have circular, elliptical, square, or any other shaped cross-section. In other embodiments, the cross-section shape may vary from one end of the storage bin 160 to the other end. For example, the storage bin 160 may narrow, taper, or step at some point over the height of the storage bin 160. This may be advantageous, for example, in situations where items with different sizes and/or other features are stored in the same storage bin 160 and changes in the storage bin 160 geometry prevent and/or allow different items to fit into the storage bin 160 more or less. In other embodiments, the storage bin 160 may include various dividers (not shown) to compartmentalize the storage bin 160 into different areas. For example, in various embodiments, these dividers may be the full height of the storage bin 160 or may be only at the bottom.

The storage bin 160 may be constructed from various materials, including, for example, wood, plastic, metal, etc. In yet other embodiments, one or more storage bins 160 may be integrated or formed with the tub 120 as a one-piece assembly. For example, the tub 120 and one or more storage bins 160 may be molded as one plastic part.

As shown in this embodiment, the storage bin 160 may also include a lid 170. The lid 170 can cover the open area (e.g., top or side) of the storage bin 160. The lid 170 may be attached to the storage bin 160 or selectively removable. In other embodiments, the lid 170 may be hinged to a surface of the storage bin 160. In some embodiments, the lid 170 includes a locking mechanism 172 for locking the lid 170 in an open and/or a closed position. In yet another embodiment, the locking mechanism 172 includes a pivotable portion and a slideable portion such that the lid 170 can slide under the rim 128 of the tub 120 when the lid 170 is closed on top of the storage bin 160.

Figure 6:
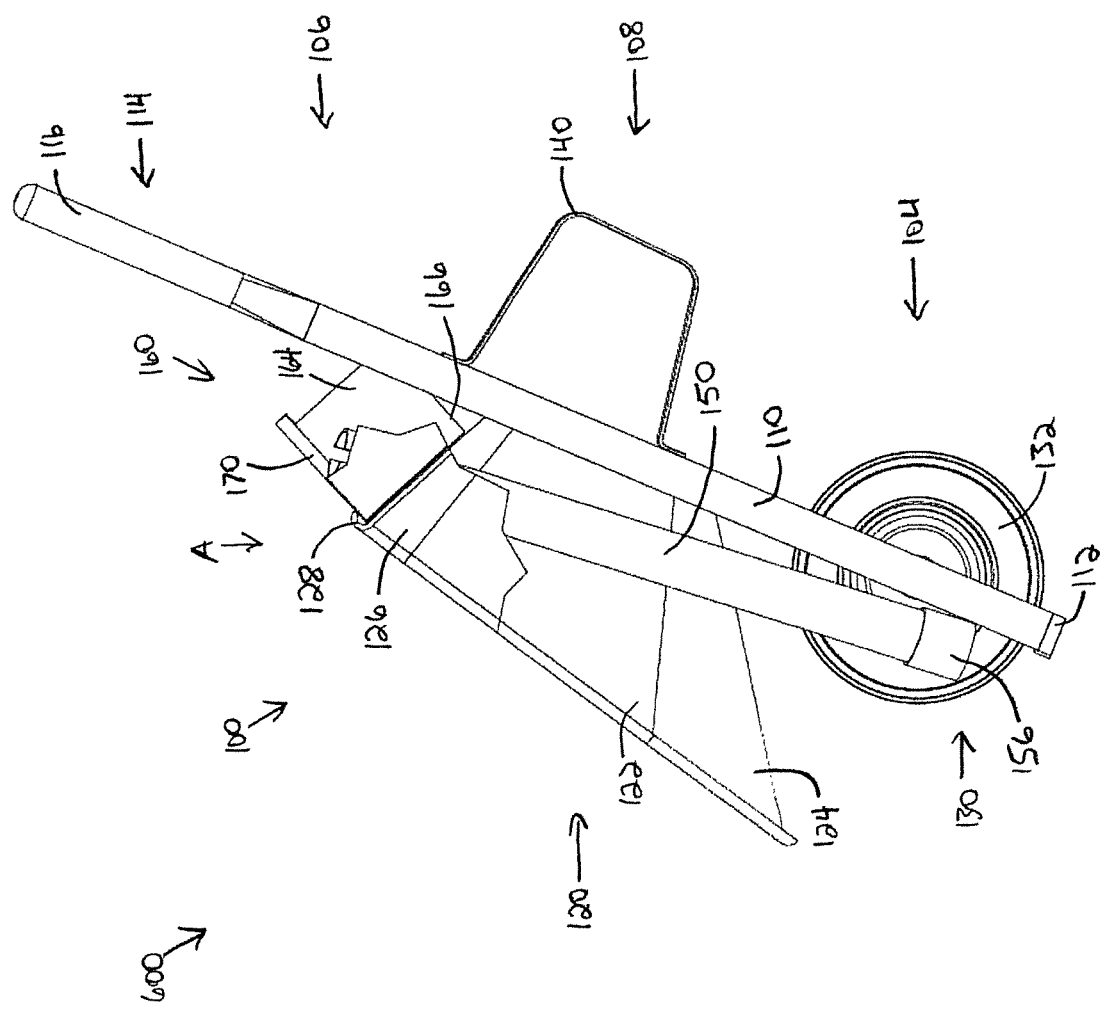
FIG. 6 is a side view of one embodiment of a wheelbarrow having multiple auxiliary storage devices in a tipping position

FIG. 6 is a side view of one embodiment of the wheelbarrow 100 in a tipping position 600. In this embodiment, the storage bin 160 includes the lid 170 and the locking mechanism 172 for locking the lid 170 in the closed position while the wheelbarrow 100 is tipped forward, for example, to dump materials from the tub 120. FIG. 6 includes a cut-out section A showing a top surface of the lid 170 locked under the rim 128 of the tub 120 to prevent the lid 170 from opening while the wheelbarrow 100 is tipped forward.

In some embodiments, the wheelbarrow 100 may include more than one storage bin 160. The storage bins 160 may have the same size, configuration, mounted location (e.g., opposite sides), etc. In other embodiments, any combination of storage bins 160 with various sizes (e.g., heights, widths, lengths, diameters, tapers, etc.), configurations (e.g., top open, side open, notched, holed, etc.), locations (affixing points, etc.), materials, can be utilized in one or more wheelbarrows 100. Utilization of different storage bins 160 on the same wheelbarrow 100 may be advantageous to accommodate storing a variety of items on one wheelbarrow 100.

In some embodiments, the mounting members used to affix the tubes 150 and/or the storage bins 160 to the frame assembly 102, the tub 120, and/or another portion of the wheelbarrow 100 may be the same mounting members used to assemble the various components of the wheelbarrow 100 mentioned above. In other words, the mounting members may be shared or multi-purposed, such that the mounting members perform more than function.

In some embodiments, one or more auxiliary storage devices (e.g., tubes 150 and/or storage bins 160) may be mounted to the wheelbarrow 100 during or after assembly of the wheelbarrow 100. For example, the wheelbarrow 100 may be originally built with tubes 150 and/or storage bins 160 or the tubes 150 and/or the storage bins 160 may be affixed to the wheelbarrow 100 after assembly of the wheelbarrow 100. For example, in one embodiment, one or more auxiliary storage devices (e.g., tubes 150 and/or storage bins 160) may be included in a kit to add auxiliary storage capabilities to an existing wheelbarrow that did not originally include auxiliary storage devices. The auxiliary storage device kit may include one or more mounting members, which may include, for example, various brackets, hardware (e.g., nuts, bolts, screws, washers, etc.), spacers, adhesives, etc., necessary to affix or mount the auxiliary storage devices (e.g., tubes 150 and/or storage bins 160) to the wheelbarrow 100.

Figure 7:
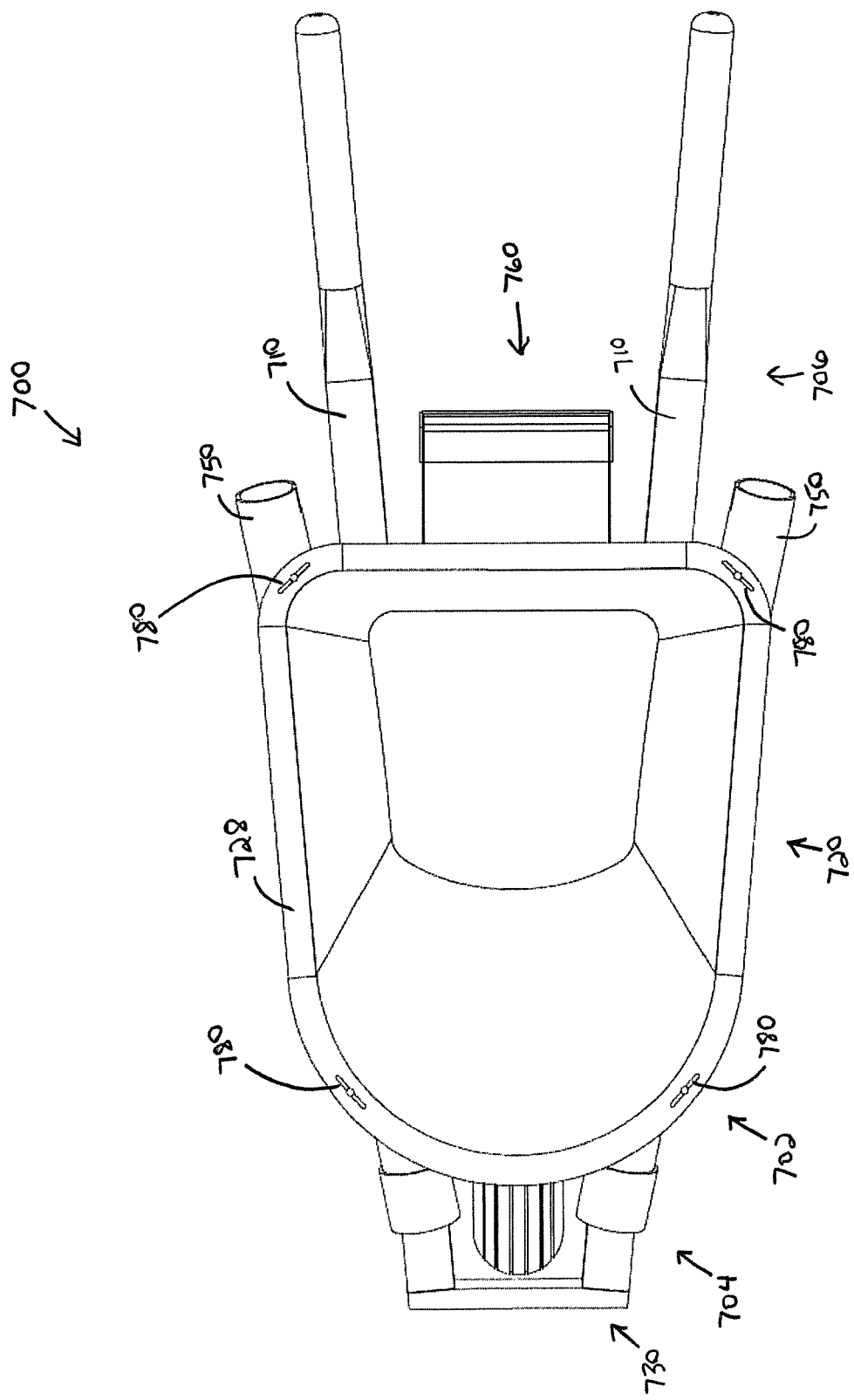
FIG. 7 is a top view of one embodiment of a wheelbarrow having multiple transport pins.

FIGS. 7-11 illustrate embodiments of a wheelbarrow with transport pins for stabilizing materials transported by a wheelbarrow. FIG. 7 illustrates a top view of an embodiment of a wheelbarrow 700, which includes a frame assembly 702 (including a front extension 704, a rear extension 706, side members 710, and a base extension (not shown)), a wheel assembly 730 mounted to the front extension 704 of the frame assembly 702, and a tub 720 mounted to the frame assembly 702. In this embodiment, the tub 720 includes a rim 728 around a top perimeter of the tub 720. In one embodiment, the rim 728 is a molded or rolled edge.

The wheelbarrow 700 may also include one or more auxiliary storage devices. As shown, the wheelbarrow 700 includes two exemplary tubes 750 and an exemplary storage bin 760 for storing various items and materials associated with the wheelbarrow 700 or a project, as described in more detail above.

The features of the wheelbarrow 700 may be the same and/or similar to the corresponding features, for example, 102, 104, 106, 108, 120, 128, 130, 150, 160, of the exemplary wheelbarrow 100 described above, including any associated other components, configurations of components, shapes of components, and component materials for the wheelbarrow 100, 700. The wheelbarrow 700 also includes various mounting members, which may include, for example, brackets, hardware (e.g., nuts, bolts, screws, washers, etc.), spacers, adhesives, etc., necessary to assemble the various components mentioned above.

Wheelbarrow 700 also includes four transport pins 780 installed in exemplary locations around the rim 728 of the tub 720 and generally extending vertically above the rim 728 surface. The transport pins 780 may be selectively attached to and/or installed into the wheelbarrow 700 and utilized to stabilize items transported by the wheelbarrow 700. For example, items that may be too long to fit inside of the tub 720 (e.g., lumber, pipes, rebar, tools with long handles, etc.) may be placed across the rim 728 of the wheelbarrow 700 in a side-to-side and/or front-to-back orientation between the transport pins 780. These items can rest against and/or attach to the transport pins 780 during transport, thereby providing additional benefits, including, for example, greater capacity, improved safety, etc.

For example, the transport pins 780 can prevent items too long to fit inside of the tub 720 from moving by resting against the transport pins 780. In another example, various items, including, for example, items too long to fit inside of the tub 720 and/or unstable items inside the tub 720, may be attached or tethered to one or more transport pins 780 for increased stability and to prevent and/or reduce movement of the item(s) during transport. In other embodiments, the transport pins may have one or more bends, eyelets, or loops at their ends, making them more suitable for tethering uses. It should be appreciated that various transport pin sizes, shapes, variations, configurations, and combinations can be implemented as required to stabilize items transported by the wheelbarrow 700. The transport pins 780 may be constructed from various materials, including, for example, plastic, wood, metal, and combinations thereof.

Increased stability can increase the capacity and/or the safety of the wheelbarrow 700. For example, more materials can be transported safely if the materials are stabilized to prevent them from toppling over or rolling off of the wheelbarrow 700. Also, heavy items within the tub 720 can destabilize the center of gravity of the wheelbarrow 700 if they are allowed to move and/or roll around within the tub 720, potentially causing the wheelbarrow 700 to tip due to imbalance.

Although four transport pins 780 generally located in the four corners of the rim 728 around the tub 720 are shown in FIG. 7, in other embodiments any number of transport pins 780 may be installed in various and optional locations around the rim 728 of the tub 720 and/or at other locations on the wheelbarrow 700. For example, in another embodiment, transport pins may be attached to the side members 710 of the wheelbarrow 700.

Figure 8:
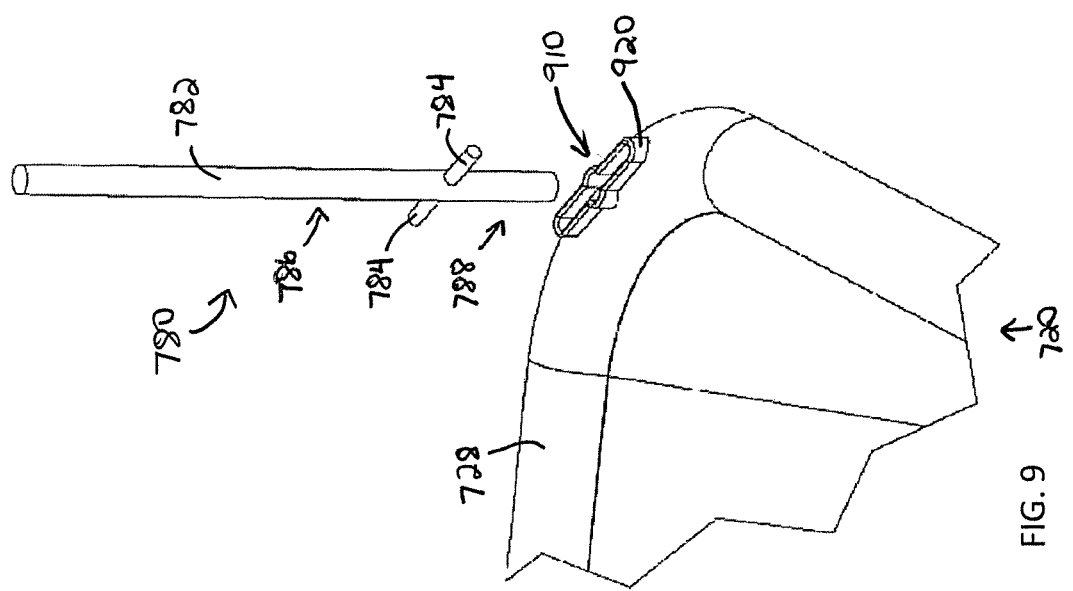
FIG. 8 is a perspective view of one embodiment of a transport pin and a mating recess.

With further reference to FIG. 8, in one embodiment, the transport pins 780 may include a center shaft 782 and cross-arms 784. The center shaft 782 may act as the primary stability feature of the transport pin 780, while the cross-arms 784 may act as an engagement feature to interface with the rim 728 of the tub 720 and/or other features of the wheelbarrow 700.

For example, in one embodiment, as shown in FIG. 8, the cross-arms 784 of the transport pin 780 are configured to engage with a recess 810 formed in the rim 728 of the tub 720. The recess 810 is shown with a center portion 812 configured to accept the center shaft 782 of the transport pin 780 and side portions 814 configured to accept the cross-arms 784 of the transport pin 780. The recess 810 is also shown with nubs 820 to create an interference fit between the cross-arms 784 of the transport pin 780 and the recess 810 when the transport pin 780 is installed into the tub 720 to prevent the transport pin 780 from excessive movement within and/or falling out of the recess 810. In other embodiments, various other engagement features may be associated with the transport pin 780 and/or the recess 810 instead of or in addition to the nubs 820.

The bottom of the center portion 812 of the recess 810 is configured with a hole that allows the center shaft 782 of the transport pin 780 to pass through the rim 728 of the tub 720 as the transport pin 780 is inserted into the tub 720. The bottom of the side portions 814 of the recess 810 are configured with a shape that nests with the cross-arms 784 of the transport pin 780 to stop the transport pin 780 as it is inserted into the tub 720.

Figure 9:
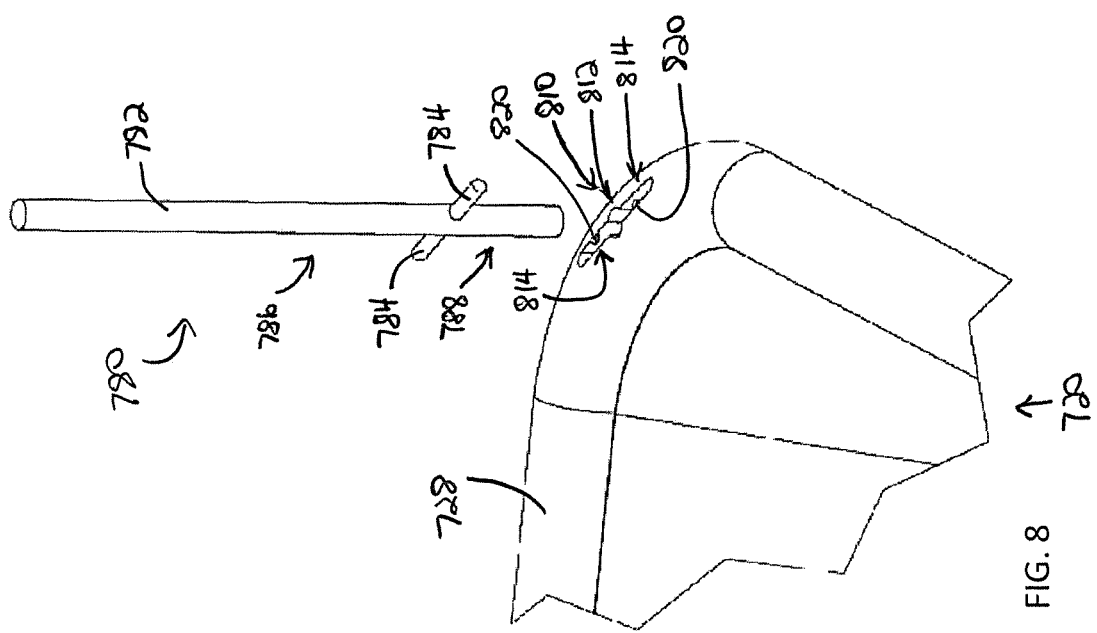
FIG. 9 is a perspective view of another embodiment of the transport pin and another mating recess.

In one embodiment, the recess 810 may be molded into the rim 728 of the tub 720 when the tub 720 is manufactured. In another embodiment, as shown in FIG. 9, a recess 910 may be added on top of the rim 728 of the tub 720 with a transport pin catch 920. The pin catch 920 may be installed by the tub 720 manufacturer or may be part of a retrofit kit that adds the transport pin 728 feature to an existing wheelbarrow. In this embodiment, the pin catch 920 may be installed to the tub 720 with any suitable attachment means, including, for example, adhesives, brackets, hardware, etc. To allow the transport pin to engage with the pin catch 920, a hole may be created in the rim 728 of the tub 720 at the center portion of the pin catch 920 to allow the center shaft 782 of the transport pin 780 to pass through the rim 728 of the tub 720 as the transport pin 780 is inserted into the tub 720. The cross-arms 784 of the transport pin 780 will stop against the rim 728 of the tub 720 as the transport pin 780 is inserted into the tub 720. The pin catch 920 may be constructed from various materials, including, for example, plastic, wood, metal, and combinations thereof.

It should be appreciated that various other engagement features may be included in the transport pins 780 and the rim 728 of the tub 720 and/or other features of the wheelbarrow 700 to attach and/or install one or more transport pins 780 into the wheelbarrow 700.

Figure 10:
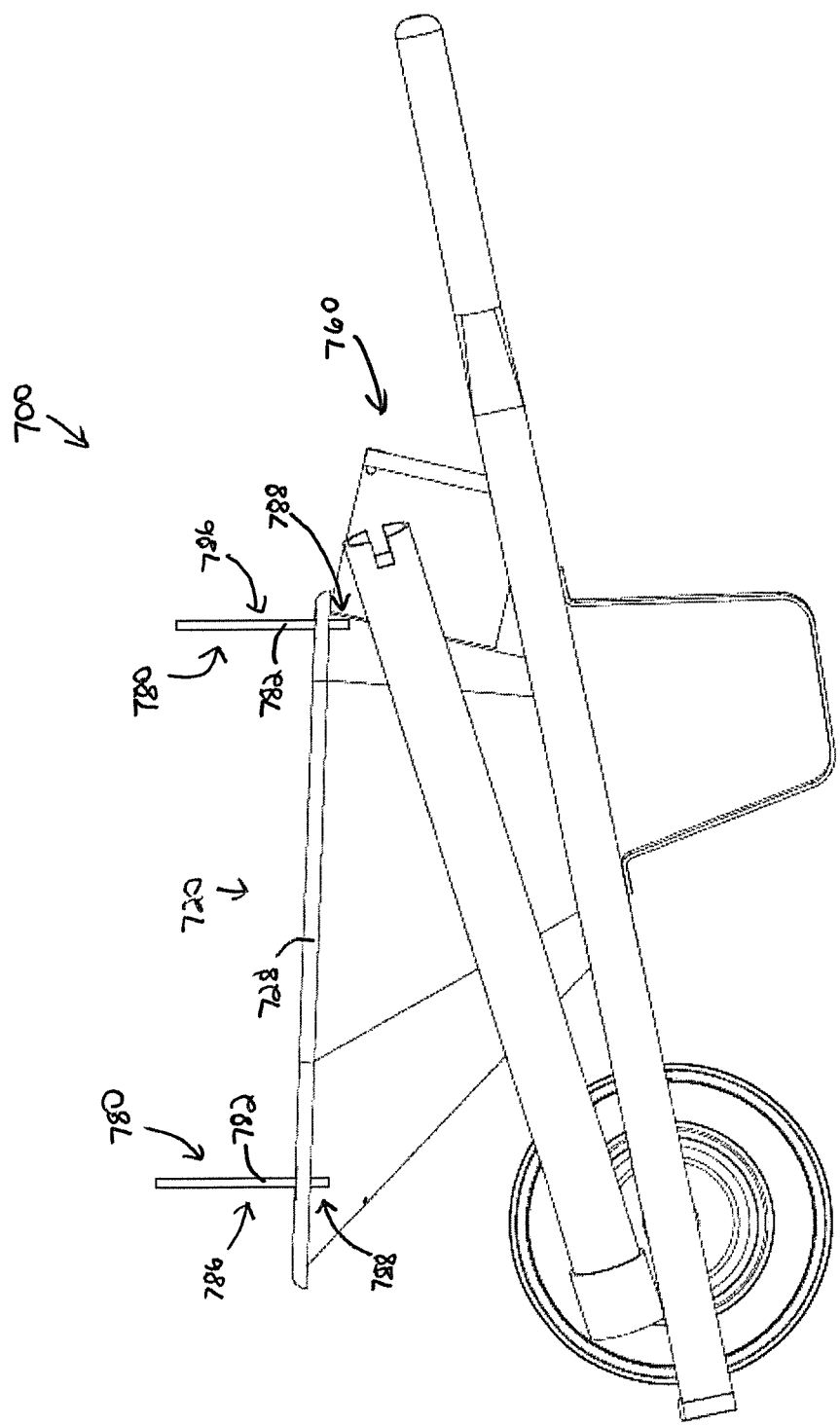
FIG. 10 is a side view of one embodiment of a wheelbarrow having multiple transport pins in the transport position.

FIG. 10 illustrates a side view of an embodiment of wheelbarrow 700 with transport pins 780 installed into the tub 720 of the wheelbarrow 700 with the center shafts 782 of the transport pins 780 passing through the rim 728 of the tub 720. In this manner, a top portion 786 of the center shaft 782 extends generally vertically above the rim 728 of the tub 720 and a bottom portion 788 of the center shaft 782 extends generally vertically below the rim 728 of the tub 720. When not installed in the tub 720 of the wheelbarrow 700, the transport pins 780 may be stored elsewhere, including, for example, in the storage bin 760 of the wheelbarrow, in holes in the side members 710 of the wheelbarrow 700, etc. In some embodiments, the storage bin 760 may include various holes (not shown) for accepting a feature of the transport pins 780 during storage. In yet other embodiments the transport pins 780 may include a magnetic material, allowing them to be stored against a ferromagnetic material, or vice versa.

Figure 11:
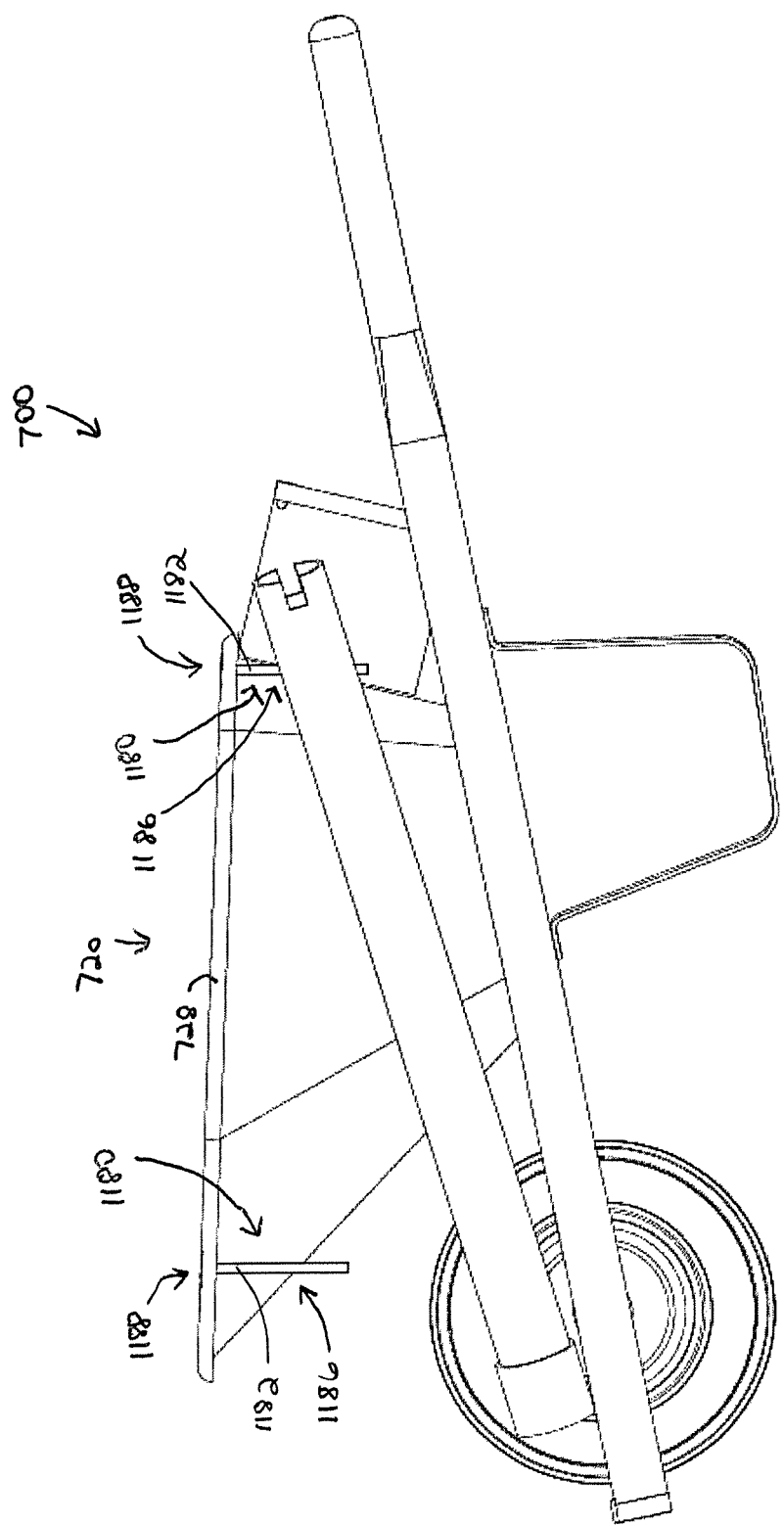
FIG. 11 is a side view of one embodiment of a wheelbarrow having multiple transport pins in the stored position.

In another embodiment, as shown in FIG. 11, transport pins 1180 are shown in a storage position in the recess 810 (not shown) of the rim 728 of the tub 720. In this embodiment, a center shaft 1182 of the transport pins 1180 includes a top portion 1186 and a bottom portion 1188. In the transport position (not shown), the top portion 1186 extends generally vertically above the rim 728 of the tub 720 and the bottom portion 1188 extends generally vertically down into the hole of the recess 810. For the storage position, as shown in FIG. 11, this embodiment allows the transport pins 1180 to be stored upside down in the recess 810, engaged in a manner similar to the transport position. However, in this embodiment, the length of the bottom portion 1188 of the center shaft 1182 of the transport pins 1180 is such that, when stored upside down in the recess 810, the bottom portion 1188 of the center shaft 1182 does not extend above the surface of the rim 728 of the tub 720. I.e, the stored transport pins 1180 are flush with or below the surface of the rim 728, thereby allowing unencumbered use of the wheelbarrow 700 when the transport pins 1180 are not needed and stored in the recess 810.

In other embodiments, various caps or covers may be installed over and/or within recesses 810, 910 when the transport pins 780, 1180 are not in use (including when the transport pins are stored in the storage bin 760 or in the recesses 810, 910), to prevent debris and/or other materials from collecting in the recesses 810, 910 and obstructing their use.

In yet other embodiments, multiple and various sizes, shapes, and configurations of transport pins 780, 1180 may be used together or individually. For example, various transport pins 780, 1180 may have center shafts 782, 1182 with different top portion 786, 1186 lengths suitable for different and various uses. In one embodiment, transport pins 780, 1180 with longer top portion 786, 1186 lengths may be used at the front of the wheelbarrow 700 to support or stabilize one type of item while transport pins 780, 1180 with shorter top portion 786, 1186 lengths may be used at the rear of the wheelbarrow 700 to support or stabilize another type of item.

Wheelbarrow 700 may include a transport pin kit that includes various sizes, shapes, and configurations of transport pins. For example, the transport pin kit may include various transport pins with different top portion straight lengths and various transport pins with bends, eyelets, and/or loops, making them more suitable for tethering uses.

In operation, the tub of a wheelbarrow is commonly used to transport loose materials. However, the loose materials are typically associated with a project that also requires various other items and/or materials, including, for example, tools, gloves, hardware, etc. For example, the tub of a wheelbarrow may be used to transport soil, gravel, mulch, etc. associated with a landscaping project. Other materials, such as, for example, a rake, a shovel, gloves, a hand spade, a bag of grass seed, etc. may also be required. Ordinarily, a user would have to make multiple trips from where the other items and materials are located to the project area or try to load the other materials onto the wheelbarrow. It can be difficult, awkward, and even dangerous to try to balance the wheelbarrow with these other items and materials. For example, if tools like a shovel and/or a rake are draped over the top of the loose materials in the tub, they may not lay flat or may tend to roll off of the wheelbarrow. It may be difficult for the user to balance these tools as the wheelbarrow rolls, especially over uneven terrain. It can be dangerous for the user to try to maneuver the wheelbarrow to stop the tools from rolling off of the wheelbarrow. The user may inadvertently dump the loose materials out of the tub in an area that is not the project area by losing control of the wheelbarrow or by running into or over a fallen tool.

A wheelbarrow 100, 700 with one or more auxiliary storage devices (e.g., tubes 150 and/or storage bins 160) and/or transport pins (e.g., transport pins 780, 1180) allows a user to store additional items and materials in the auxiliary storage devices of the wheelbarrow 100, 700 and/or on the wheelbarrow 100, 700. In the example above, the rake and the shovel may be stored in one or more tubes 150 and/or supported by transport pins 780, 1180. The long handles of the rake and shovel can be laid across the tub and supported by the transport pins 780, 1180 and/or slipped into the open end 152 of the tube 150 until the tine or spade end of the tool stops against the perimeter of the open end 152 or the tool handle stops against the closed end of the tube 150. Where the tine or spade end meets the open end 152, the notches 154 can engage these features of the tool to prevent the tool from moving or rotating within the tube 150. The gloves, hand spade, and bag of grass seed may be stored in one or more storage bins 160. A lid 170 on the top of the storage bin 160 can be locked into a closed position to prevent these items from falling out of the wheelbarrow 100, even as the wheelbarrow 100 is tipped forward to dump the loose materials from the tub 120 (see FIG. 6).

In another example, the tub 120 of the wheelbarrow can be used to transport cement or gravel, while transport pins 780, 1180 and/or one or more tubes 150 can be used to stabilize and/or store framing boards, rebar, rakes, and shovels, and the storage bin 160 can store papers with a drawn layout, wooden/metal stakes, a hammer, a tool belt with a measuring tape and a chalk line, a sculpting/finishing trowel, safety goggles, and nails for the framing boards. As can be appreciated, the situations where the transport pins and/or auxiliary storage devices of the wheelbarrow 100 can be utilized are many.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, component types, geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed:

1. A wheelbarrow, comprising:
    a frame assembly including a front extension, a rear extension, and a base extension;
    a tub mounted to the frame assembly;
    a wheel assembly including at least one wheel mounted to the front extension such that the tub is supported by the wheel assembly and the base extension when the wheelbarrow is at rest and the tub is supported by the wheel assembly and a user when the user lifts the rear extension to allow the wheel to rotate to move the wheelbarrow;
a storage bin affixed to the frame assembly or the tub; and
a lid affixable to the storage bin;
wherein the lid includes a self-locking mechanism that transitions the lid from an unlocked state to a locked state in a closed position as the wheelbarrow is lifted into the tipping position, and wherein the self-locking mechanism includes a slideable portion such that the lid automatically slides under a rim of the tub as the wheelbarrow is lifted into the tipping position.

2. The wheelbarrow of claim 1, wherein the storage bin is box shaped.

3. The wheelbarrow of claim 1, wherein the storage bin includes a locking mechanism for locking the lid closed when the wheelbarrow is not in the tipping position.

4. The wheelbarrow of claim 1, further comprising:
a mounting member for mounting the storage bin to the frame or the tub of the wheelbarrow.

5. The wheelbarrow of claim 1, further comprising:
a tube affixed to the frame assembly or the tub in a substantially horizontal position, wherein the tube is configured to store an item transported by the wheelbarrow and retain the item stored in the tube when the wheelbarrow is in a tipping position, and wherein the tube comprises:
a first end of the substantially horizontal tube oriented towards the rear extension of the frame assembly; and
a second end of the substantially horizontal tube oriented towards the front extension of the frame assembly.

6. The wheelbarrow of claim 5, wherein the first end of the tube includes a notch along a perimeter of an open end that engages a feature of the transported item when stored in the tube.

7. The wheelbarrow of claim 5, further comprising:
a mounting member for mounting the tube to the frame or the tub of the wheelbarrow in the substantially horizontal position.

8. A wheelbarrow, comprising:
a frame assembly including a front extension, a rear extension, and a base extension;
a tub mounted to the frame assembly;
a wheel assembly including at least one wheel mounted to the front extension such that the tub is supported by the wheel assembly and the base extension when the wheelbarrow is at rest and the tub is supported by the wheel assembly and a user when the user lifts the rear extension to allow the wheel to rotate to move the wheelbarrow; and
at least one transport pin affixable to a rim of the tub, wherein the affixed transport pin extends above the rim to stabilize an item transported by the wheelbarrow when the transported item is placed on top of the rim of the tub when the transport pin is affixed in a transport position, wherein the transported item is longer than the tub and rests against or attaches to the at least one transport pin, and wherein the at least one transport pin is removably affixed in a recess of the rim, and wherein the at least one transport pin is stored in the recess such that the at least one transport pin does not extend above a surface surrounding the recess when the transport pin is affixed in a stored position.

9. The wheelbarrow of claim 8, wherein the at least one transport pin comprises at least two transport pins affixed on opposite sides of the tub, and wherein the transported item rests against the at least two transport pins in a side-to-side orientation across the tub and extending beyond the sides of the tub.

10. The wheelbarrow of claim 8, wherein the at least one transport pin is affixed to the rim of the tub in a substantially vertical orientation.

11. The wheelbarrow of claim 8, wherein the at least one transport pin is configured to retain the transported item on top of the rim of the tub when the wheelbarrow is in a tipping position.

12. The wheelbarrow of claim 8, wherein the at least one transport pin comprises four transport pins with two of the four transport pins affixed on each side of the tub, and wherein the transported item rests between the transport pins in a side-to-side orientation across the tub and extending beyond the sides of the tub.

13. The wheelbarrow of claim 8, wherein the at least one transport pin comprises:
a center shaft that stabilizes the transported item when the item is placed on top of the rim of the tub; and
two cross-arms that engage with the rim of the tub when the at least one transport pin is affixed to the rim of the tub.

14. The wheelbarrow of claim 13, wherein two cross-arms of each at least one transport pin are affixed in a recess of the rim when the at least one transport pin is affixed to the rim of the tub.

15. A wheelbarrow, comprising:
a frame assembly including a front extension, a rear extension, and a base extension;
a tub mounted to the frame assembly;
a wheel assembly including at least one wheel mounted to the front extension such that the tub is supported by the wheel assembly and the base extension when the wheelbarrow is at rest and the tub is supported by the wheel assembly and a user when the user lifts the rear extension to allow the wheel to rotate to move the wheelbarrow; and
at least one transport pin affixable to a rim of the tub, wherein the affixed transport pin extends above the rim to stabilize an item transported by the wheelbarrow when the transported item is placed on top of the rim of the tub when the transport pin is affixed in a transport position, wherein the transported item is longer than the tub and rests against or attaches to the at least one transport pin, and wherein the at least one transport pin comprises:
a center shaft that stabilizes the transported item when the item is placed on top of the rim of the tub; and
two cross-arms that engage with the rim of the tub when the at least one transport pin is affixed to the rim of the tub, wherein two cross-arms of each at least one transport pin are affixed in a recess of the rim when the at least one transport pin is affixed to the rim of the tub.

16. The wheelbarrow of claim 15, wherein the at least one transport pin comprises at least two transport pins affixed on opposite sides of the tub, and wherein the transported item rests against the at least two transport pins in a side-to-side orientation across the tub and extending beyond the sides of the tub.

17. The wheelbarrow of claim 15, wherein the at least one transport pin is affixed to the rim of the tub in a substantially vertical orientation.

18. The wheelbarrow of claim 15, wherein the at least one transport pin is removably affixed in a recess of the rim.

19. The wheelbarrow of claim 18, wherein the at least one transport pin is stored in the recess such that the at least one transport pin does not extend above a surface surrounding the recess when the transport pin is affixed in a stored position.

20. The wheelbarrow of claim 15, wherein the at least one transport pin is configured to retain the transported item on top of the rim of the tub when the wheelbarrow is in a tipping position.

21. The wheelbarrow of claim 15, wherein the at least one transport pin comprises four transport pins with two of the four transport pins affixed on each side of the tub, and wherein the transported item rests between the transport pins in a side-to-side orientation across the tub and extending beyond the sides of the tub.

22. A wheelbarrow auxiliary storage kit, comprising:
a wheelbarrow with a frame, a tub mounted to the frame, and a wheel assembly;
a storage bin mountable to the tub or the frame of the wheelbarrow that stores an item transported by the wheelbarrow; and
a lid affixable to the storage bin, wherein the storage bin and the affixed lid are configured to retain the transported item when the wheelbarrow is in a tipping position, wherein the lid includes a self-locking mechanism that transitions the lid from an unlocked state to a locked state in a closed position as the wheelbarrow is lifted into the tipping position, and wherein the self-locking mechanism includes a slideable portion such that the lid automatically slides under a rim of the tub as the wheelbarrow is lifted into the tipping position.

23. The wheelbarrow auxiliary storage kit of claim 22, further comprising:
at least one transport pin affixable to the rim of the tub of the wheelbarrow, wherein the affixed transport pin stabilizes another item transported by the wheelbarrow when the transported item is placed on top of the rim of the tub.

24. The wheelbarrow auxiliary storage kit of claim 23, wherein the at least one transport pin is configured to retain the transported item on top of the rim of the tub when the wheelbarrow is in the tipping position.

25. The wheelbarrow auxiliary storage kit of claim 22, further comprising:
a tube mountable to the tub or the frame of the wheelbarrow that stores another item transported by the wheelbarrow, wherein the tube is configured to retain the transported item when the wheelbarrow is in the tipping position.

* * * * *